US007912027B2

(12) United States Patent
Brown et al.

(10) Patent No.: US 7,912,027 B2
(45) Date of Patent: *Mar. 22, 2011

(54) CONTROLLING VISIBILITY OF A WIRELESS DEVICE IN DISCOVERABLE MODE

(75) Inventors: Michael K. Brown, Fergus (CA);
Michael G. Kirkup, Waterloo (CA);
Michael S. Brown, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/788,781

(22) Filed: May 27, 2010

(65) Prior Publication Data

US 2010/0232321 A1    Sep. 16, 2010

Related U.S. Application Data

(63) Continuation of application No. 12/503,010, filed on Jul. 14, 2009, now Pat. No. 7,751,380, which is a continuation of application No. 11/218,609, filed on Sep. 6, 2005, now Pat. No. 7,603,083.

(51) Int. Cl.
*H04W 4/00* (2009.01)
(52) U.S. Cl. ........ 370/338; 370/328; 370/310; 455/41.2
(58) Field of Classification Search .................. 455/500, 455/503, 517, 411, 41.2, 550.1, 553.1, 558; 370/310–310.2, 328, 338
See application file for complete search history.

(56) References Cited

U.S. PATENT DOCUMENTS

| 5,440,559 | A   |   | 8/1995  | Gaskill         |          |
|-----------|-----|---|---------|-----------------|----------|
| 6,748,195 | B1  |   | 6/2004  | Phillips        |          |
| 6,879,810 | B2  |   | 4/2005  | Bouet           |          |
| 6,950,645 | B1  |   | 9/2005  | Kammer et al.   |          |
| 7,603,083 | B2  | * | 10/2009 | Brown et al.    | 455/41.2 |
| 7,751,380 | B2  | * | 7/2010  | Brown et al.    | 370/338  |
| 2002/0077139 | A1 |   | 6/2002  | Bouet           |          |
| 2002/0123325 | A1 |   | 9/2002  | Cooper          |          |
| 2002/0188863 | A1 |   | 12/2002 | Friedman        |          |
| 2002/0197956 | A1 |   | 12/2002 | Annola et al.   |          |
| 2003/0100315 | A1 |   | 5/2003  | Rankin          |          |
| 2003/0114107 | A1 |   | 6/2003  | Aoyagi          |          |
| 2003/0183691 | A1 |   | 10/2003 | Lahteenmaki et al. |       |
| 2003/0228842 | A1 |   | 12/2003 | Heinonen et al. |          |
| 2004/0142691 | A1 |   | 7/2004  | Jollota et al.  |          |
| 2004/0192207 | A1 |   | 9/2004  | Ketola          |          |

(Continued)

FOREIGN PATENT DOCUMENTS

EP        1255383        11/2002

(Continued)

OTHER PUBLICATIONS

Afshar, Kamran, First Office Action for U.S. Appl. No. 11/218,609, Apr. 21, 2008.

(Continued)

*Primary Examiner* — Kamran Afshar
(74) *Attorney, Agent, or Firm* — Integral Intellectual Property Inc.; Miriam Paton

(57) ABSTRACT

A wireless device in a discoverable mode controls its visibility by determining whether to ignore or respond to an inquiry, received from an inquiring device, based at least in part on one or more properties of the inquiring device.

18 Claims, 4 Drawing Sheets

U.S. PATENT DOCUMENTS

| | | | |
|---|---|---|---|
| 2004/0203384 A1 | 10/2004 | Sugikawa et al. |
| 2004/0224723 A1 | 11/2004 | Farcasiu |
| 2004/0266350 A1 | 12/2004 | Kim |
| 2005/0020207 A1 | 1/2005 | Hamada et al. |
| 2005/0113137 A1 | 5/2005 | Rodriguez et al. |
| 2006/0035631 A1 | 2/2006 | White et al. |
| 2006/0128305 A1 | 6/2006 | Delalat |
| 2006/0198448 A1 | 9/2006 | Aissi et al. |
| 2006/0199537 A1 | 9/2006 | Eisenbach |
| 2006/0236117 A1 | 10/2006 | Lazaridis et al. |
| 2006/0293028 A1 | 12/2006 | Gadamsetty et al. |
| 2007/0053313 A1 | 3/2007 | Adams et al. |

FOREIGN PATENT DOCUMENTS

| | | |
|---|---|---|
| EP | 1416703 | 5/2004 |
| WO | WO-01/39577 | 6/2001 |
| WO | WO-03021978 | 3/2003 |

OTHER PUBLICATIONS

Afshar, Kamran , First Office Action for U.S. Appl. No. 12/503,010, Oct. 27, 2009.

Afshar, Kamran , Notice of Allowance for U.S. Appl. No. 12/503,010, Feb. 24, 2010.

Afshar, Kamran , Second Office Action for U.S. Appl. No. 11/218,609, Oct. 23, 2008.

Bluetooth SIG, , "Bluetooth Core specifications 2.1 pp. 227 and 228", Jul. 26, 2007 , 227-228.

Frantzeskakis, D-P , "EESR", Extended European Search Report for EP 05108131.3, Feb. 23, 2006.

Gryazin, E A. , "Service Discovery in Bluetooth", Helsinki University of Technology, Oct. 6, 2000, XP002311799 Oct. 6, 2000.

Jin, Jing , Second Office Action for CN 200610128136.6, Aug. 7, 2009.

Jing, Jin , First Office Action w/translation for CN 200610128136.6, Jul. 4, 2008.

Matar, G. , First Office Action for CA 2554325, Nov. 5, 2008.

Matar, G. , Second Office Action for CA 2,554,325 Jun. 8, 2010.

Mele, Marco , Extended European Search Report for EP 05108130.5, Feb. 14, 2006.

Mele, Marco , First Examination Report for EP05108130.5, May 3, 2007.

Mele, Marco , Second Examination Report for EP05108130.5, Sep. 22, 2008.

Shaked, Yaniv et al., "Cracking the Bluetooth PIN", May 2, 2005.

Syed, Camran , First Office Action for CA 2558936, Feb. 12, 2009.

Syed, Camran , Second Office Action for CA 2,558,936, Mar. 15, 2010.

Zewari, Sayed T. , Advisory Action for U.S. Appl. No. 11/218,608, Mar. 11, 2009.

Zewari, Sayed T. , Final Office Action for U.S. Appl. No. 11/218,608 , Jan. 2, 2009.

Zewari, Sayed T. , First Office Action for U.S. Appl. No. 11/218,608, Jul. 30, 2008.

Zewari, Sayed T. , Non Final Office Action for U.S. Appl. No. 11/218,608, Jan. 27, 2010.

Zewari, Sayed T. , Notice of Allowance for U.S. Appl. No. 11/218,608, May 19, 2010.

Zewari, Sayed T. , Second Office Action for U.S. Appl. No. 11/218,608, Jun. 18, 2009.

\* cited by examiner

CONTROLLING VISIBILITY OF A WIRELESS DEVICE IN DISCOVERABLE MODE

CROSS-REFERENCE TO RELATED APPLICATIONS

This application is a continuation of U.S. patent application Ser. No. 12/503,010 filed Jul. 14, 2009, which is itself a continuation of U.S. patent application Ser. No. 11/218,609 filed Sep. 6, 2005, which issued Oct. 13, 2009 as U.S. Pat. No. 7,603,083. Both applications are entitled "Controlling Visibility of a Wireless Device in Discoverable Mode" and are incorporated by reference in their entirety.

BACKGROUND

Bluetooth® wireless technology provides an easy way for a wide range of

Bluetooth® devices (BT devices) to communicate with each other and connect to the Internet without the need for wires, cables and connectors.

The Bluetooth® core specifications v1.1, published Feb. 22, 2001 by the Bluetooth® special interest group (SIG) and the Bluetooth® core specifications v1.2, published Nov. 5, 2003, include provisions for an Inquiry procedure where a BT device transmits inquiry messages and listens for responses in order to discover the other BT devices that are within range.

The Bluetooth® v1.1 and v1.2 specifications include provisions for three discoverability modes: Non-Discoverable Mode, Limited Discoverable Mode and General Discoverable Mode. According to these specifications, a device is in one, and only one, discoverability mode at a time.

When a BT device is in Non-Discoverable Mode it does not respond to inquiry messages. A BT device is said to be discoverable when it is in Limited Discoverable Mode or General Discoverable Mode. The Bluetooth® v1.1 and v1.2 specifications include provisions for a Limited Inquiry procedure and a General Inquiry procedure. Only devices in Limited Discoverable Mode are discovered by the Limited Inquiry procedure. A General Inquiry procedure will detect discoverable devices, regardless of the discoverable mode.

Even when a BT device is discoverable, it may be unable to respond to inquiry messages due to other baseband activity. A BT device that does not respond to inquiry messages due to being in Non-Discoverable Mode or due to other baseband activity is called a silent device. In Limited Discoverable Mode, a BT device is visible to all other BT devices that are within range, but only for limited periods of time. In General Discoverable Mode, a BT device is visible to all other BT devices that are within range, continuously or for no specific condition.

Even when not discoverable, a BT device is visible to other BT devices and users that are familiar with its Bluetooth® device address. The Bluetooth® device address is a unique 48-bit device identifier, where three bytes of the address are assigned to a specific manufacturer by the Institute of Electrical and Electronics Engineers (IEEE), and the other three bytes are freely allocated by the manufacturer.

There are a greater number of security concerns when a BT device is discoverable. A non-exhaustive list of examples for the security concerns includes eavesdropping on the data transferred during the communication of two BT devices, and the ability to fully impersonate other BT devices.

Similar concerns may arise with devices compatible with other wireless communication protocols, a non-exhaustive list of examples for which includes ZigBee™ radio frequency identification (RFID), ultra wideband (UWB), IEEE 802.11, and various proprietary communication protocols.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
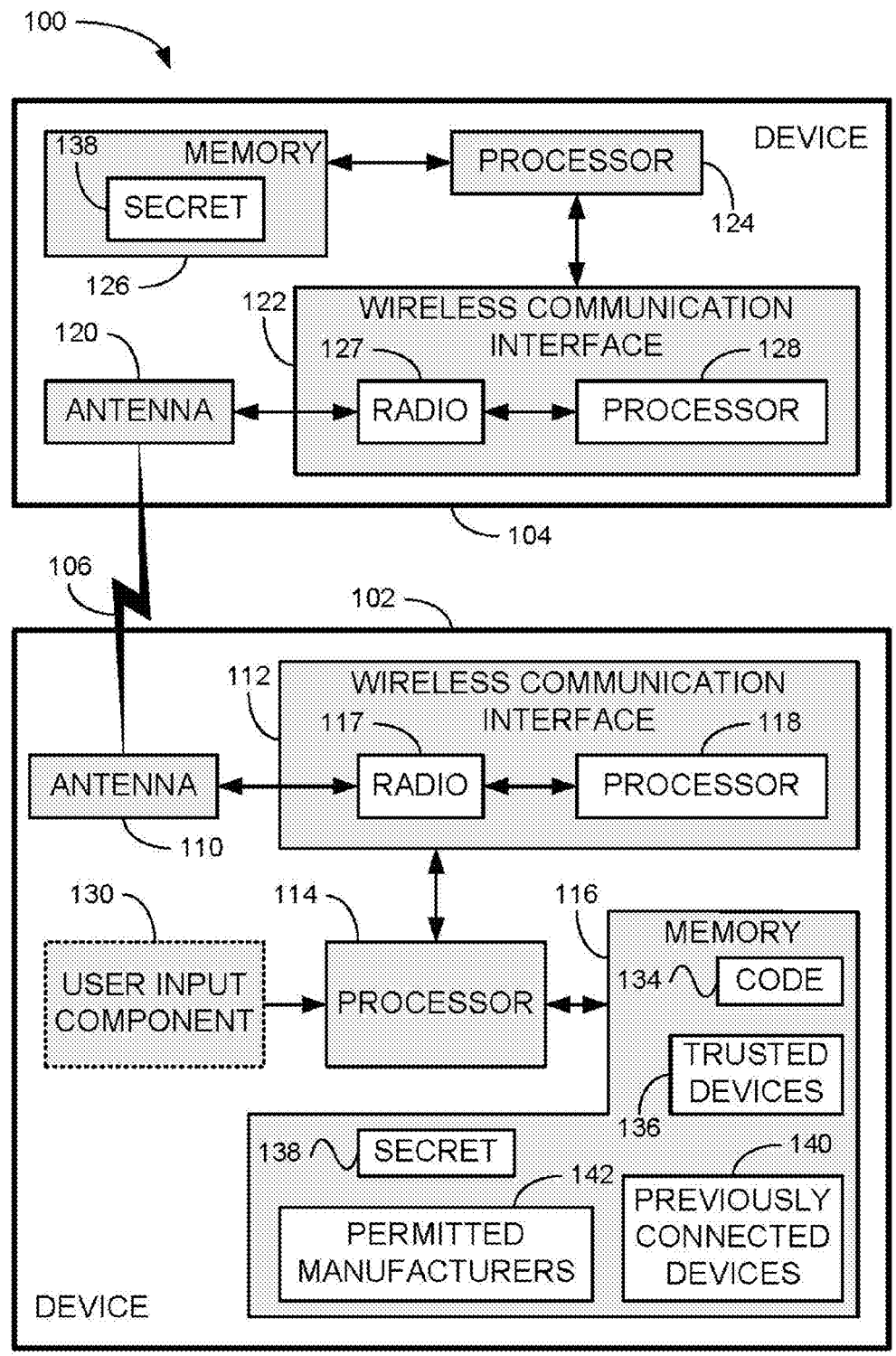
FIG. 1 is a block diagram of an exemplary communications system, according to some embodiments.

FIG. 1 is a block diagram of an exemplary communications system 100, according to some embodiments. System 100 comprises a device 102 and a device 104 able to communicate over a wireless communication link 106.

A non-exhaustive list of examples for devices 102 and 104 includes any of the following:

a) wireless human interface devices, for example, keyboards, mice, remote controllers, digital pens and the like;

b) wireless audio devices, for example, headsets, speakers, microphones, cordless telephones, handsets, stereo headsets and the like;

c) wireless computerized devices, for example, notebook computers, laptop computers, desktop personal computers, personal digital assistants (PDAs), handheld computers, cellular telephones, MP3 players, printers, facsimile machines, and the like; and d) wireless communication adapters, for example, universal serial bus (USB) adapters, personal computer memory card international association (PCMCIA) cards, compact flash (CF) cards, mini peripheral component interconnect (PCI) cards, access points, and the like.

Device 102 may support one or more discoverable modes. For example, if device 102 is a BT device, device 102 may support Limited Discoverable Mode and/or General Discoverable Mode.

Device 102 comprises an antenna 110, a wireless communication interface 112, a processor 114 coupled to wireless communication interface 112, and a memory 116 coupled to processor 114. Memory 116 may be fixed in or removable from device 102. Memory 116 may be embedded or partially embedded in processor 114. Processor 114 and memory 116 may be part of the same integrated circuit or in separate integrated circuits. Wireless communication interface 112 comprises a radio 117 coupled to antenna 110, and a processor 118 coupled to radio 117. Processor 118 may be able to cause device 102 to be in a discoverable mode. Wireless communication interface 112 and processor 114 may be part of the same integrated circuit or in separate integrated circuits.

Similarly, device 104 comprises an antenna 120, a wireless communication interface 122, a processor 124 coupled to wireless communication interface 122, and a memory 126 coupled to processor 124. Memory 126 may be fixed in or removable from device 104. Memory 126 may be embedded or partially embedded in processor 124. Processor 124 and memory 126 may be part of the same integrated circuit or in separate integrated circuits. Wireless communication interface 122 comprises a radio 127 coupled to antenna 120, and a processor 128 coupled to radio 127. Wireless communication interface 122 and processor 124 may be part of the same integrated circuit or in separate integrated circuits.

A non-exhaustive list of examples for antennae 110 and 120 includes dipole antennae, monopole antennae, multilayer ceramic antennae, planar inverted-F antennae, loop antennae, shot antennae, dual antenna, omnidirectional antennae and any other suitable antennae.

A non-exhaustive list of examples of communication protocols with which communication interfaces 112 and 122 may be compatible includes Bluetooth®, ZigBee™, radio frequency identification (RFID), ultra wideband (UWB), IEEE 802.11, and proprietary communication protocols.

A non-exhaustive list of examples for processors 114, 118, 124 and 128 includes a central processing unit (CPU), a digital signal processor (DSP), a reduced instruction set computer (RISC), a complex instruction set computer (CISC) and the like. Furthermore, processors 114, 118, 124 and 128 may be part of application specific integrated circuits (ASICs) or may be a part of application specific standard products (ASSPs).

A non-exhaustive list of examples for memories 116 and 126 includes any combination of the following:
  a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;
  b) optical devices, such as compact disk read only memory (CD ROM), and the like; and
  c) magnetic devices, such as a hard disk, a floppy disk, a magnetic tape, and the like.

Device 102 may optionally comprise a user input component 130 coupled to processor 114. Input from user input component 130 may be interpreted by processor 114 as intended to result in device 102 being in a discoverable mode. Other and/or additional user input components are also possible. For example, processor 114 may interpret combinations of input as intended to result in device 102 being in a discoverable mode.

Devices 102 and 104 may comprise additional components which are not shown in FIG. 1 and which, for clarity, are not described herein.

Figure 2:
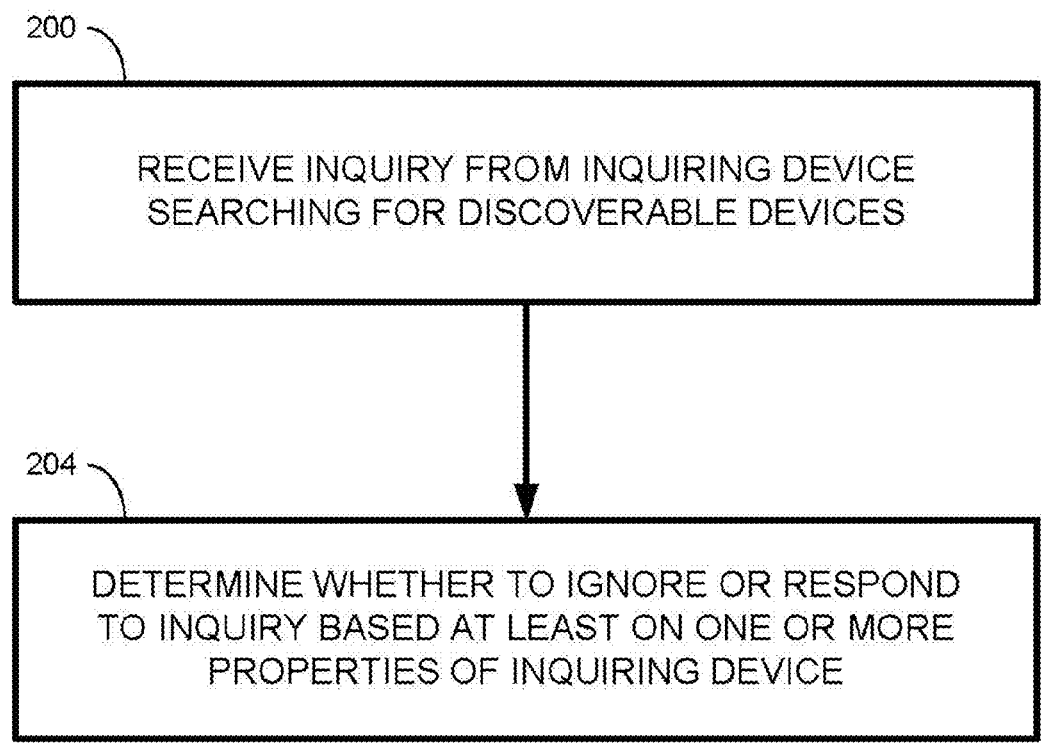
FIG. 2 is a flowchart of an exemplary method for controlling visibility of a wireless device, according to some embodiments.

FIG. 2 is a flowchart of an exemplary method for controlling visibility of a wireless device, according to some embodiments. Code 134 stored in memory 116 may implement the method of FIG. 2 in device 102.

At 200, device 102 receives an inquiry from an inquiring device, for example, device 104, that is searching for discoverable devices. For example, if devices 102 and 104 are BT devices, the inquiry may be an inquiry request according to the General Inquiry procedure or according to the Limited Inquiry procedure.

At 204, device 102 determines whether to ignore or respond to the inquiry based at least in part on one or more properties of the inquiring device. This controls the visibility of device 102, since device 102 is not detected by inquiring devices sending inquiries that are ignored by device 102. The one or more properties of the inquiring device are ascertainable by device 102 from the inquiry.

Figure 3:
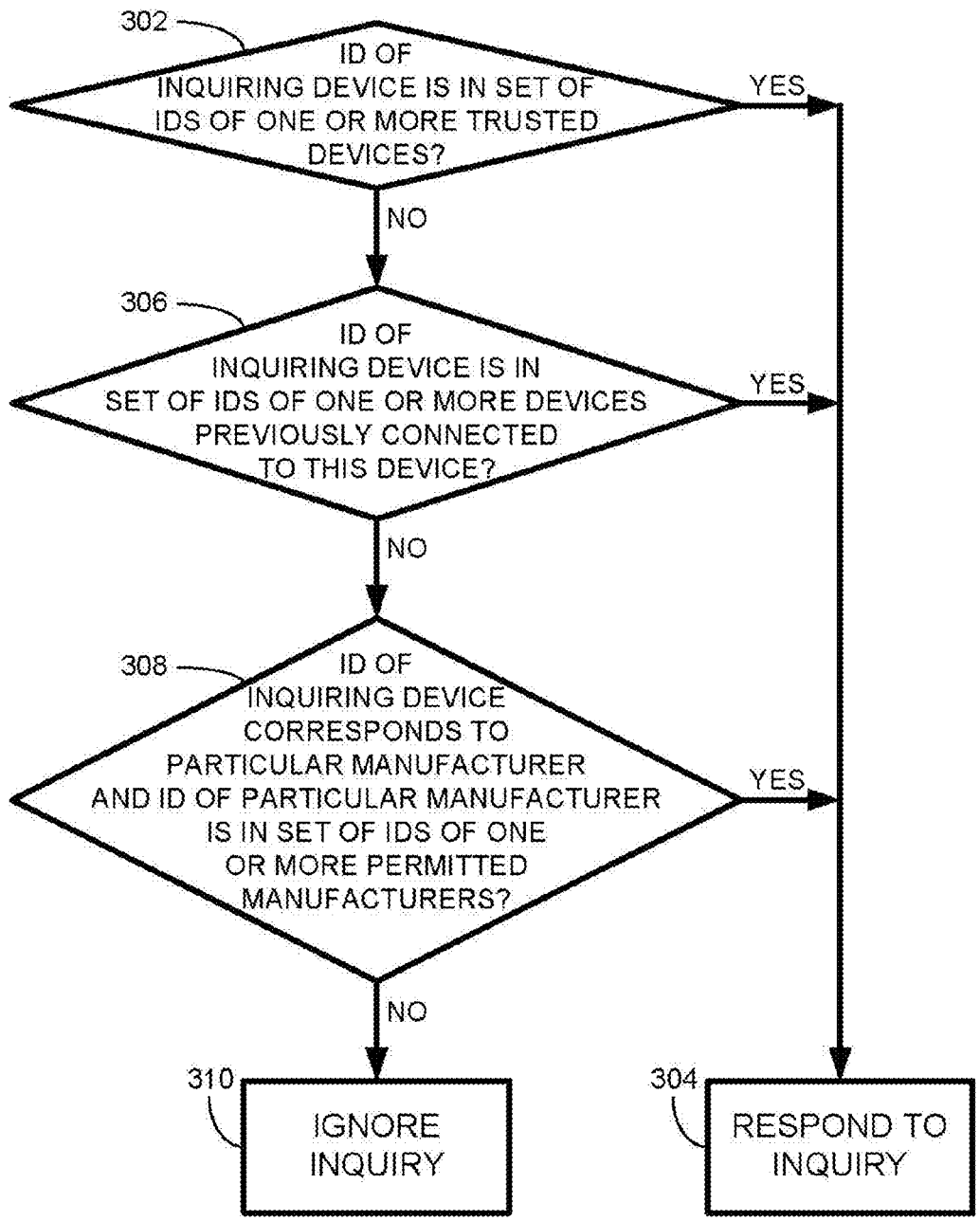
FIG. 3 is flowchart of an exemplary method for determining whether to ignore or respond to an inquiry, according to some embodiments.

FIG. 3 is a flowchart of an exemplary method for determining whether to ignore or respond to an inquiry, according to some embodiments. Code 134 stored in memory 116 may implement the method of FIG. 3 in device 102.

Device 102 may have one or more criteria that are to be met by the one or more properties of the inquiring device. Criteria and/or properties other than those described with respect to FIG. 3 are also contemplated.

Device 102 may check at 302 whether an identifier of the inquiring device is included in a set 136 of identifiers of one or more trusted devices. Device 102 may store set 136 in memory 116, as shown in FIG. 1. What constitutes a trusted device may depend on the precise implementation. For example, device 102 and device 104 may share a secret 138 that is used as a basis for a trusted relationship therebetween. Secret 138 is stored in memory 116 and in memory 126. For example, the Bluetooth® v1.1 and v1.2 specifications provide various security procedures (pairing, authentication and encryption). An Authentication procedure is based on a challenge-response scheme. Successful calculation of the authentication response requires that two devices share a secret Link Key. This Link Key is created during a Pairing procedure. If at least one authentication has been performed, then encryption may be used. The set of one or more trusted devices may include devices with which device 102 is paired.

If the identifier of the inquiring device is included in set 136, then device 102 may respond to the inquiry at 304.

If not, then device 102 may check at 306 whether the identifier of the inquiring device is included in a set 140 of identifiers of one more devices previously connected to device 102. Device 102 may store set 140 in memory 116, as shown in FIG. 1. Sets 136 and 140 may be stored in a combined manner without redundancies.

If the identifier of the inquiring device is included in set 140, then device 102 may respond to the inquiry at 304.

If not, then device 102 may check at 308 whether the identifier of the inquiring device corresponds to a particular manufacturer and an identifier of the particular manufacturer is included in a set 142 of one or more permitted manufacturers. Device 102 may store set 142 in memory 116, as shown in FIG. 1. For example, set 142 may include only an identifier of the manufacturer of device 102. In another example, set 142 may include only identifiers of manufacturers with which the manufacturer of device 102 has established an agreement. In a further example, set 142 may include only identifiers of manufacturers that are known by the manufacturer of device 102 to manufacture devices that are compatible with device 102.

If the identifier of the particular manufacturer is included in set 142, then device 102 may respond to the inquiry at 304.

If not, then device 102 may ignore the request at 310.

An example for the identifier of the inquiring device is a media access control address of the inquiring device. Another example for the identifier of the inquiring device is a Bluetooth® device address.

Figure 4:
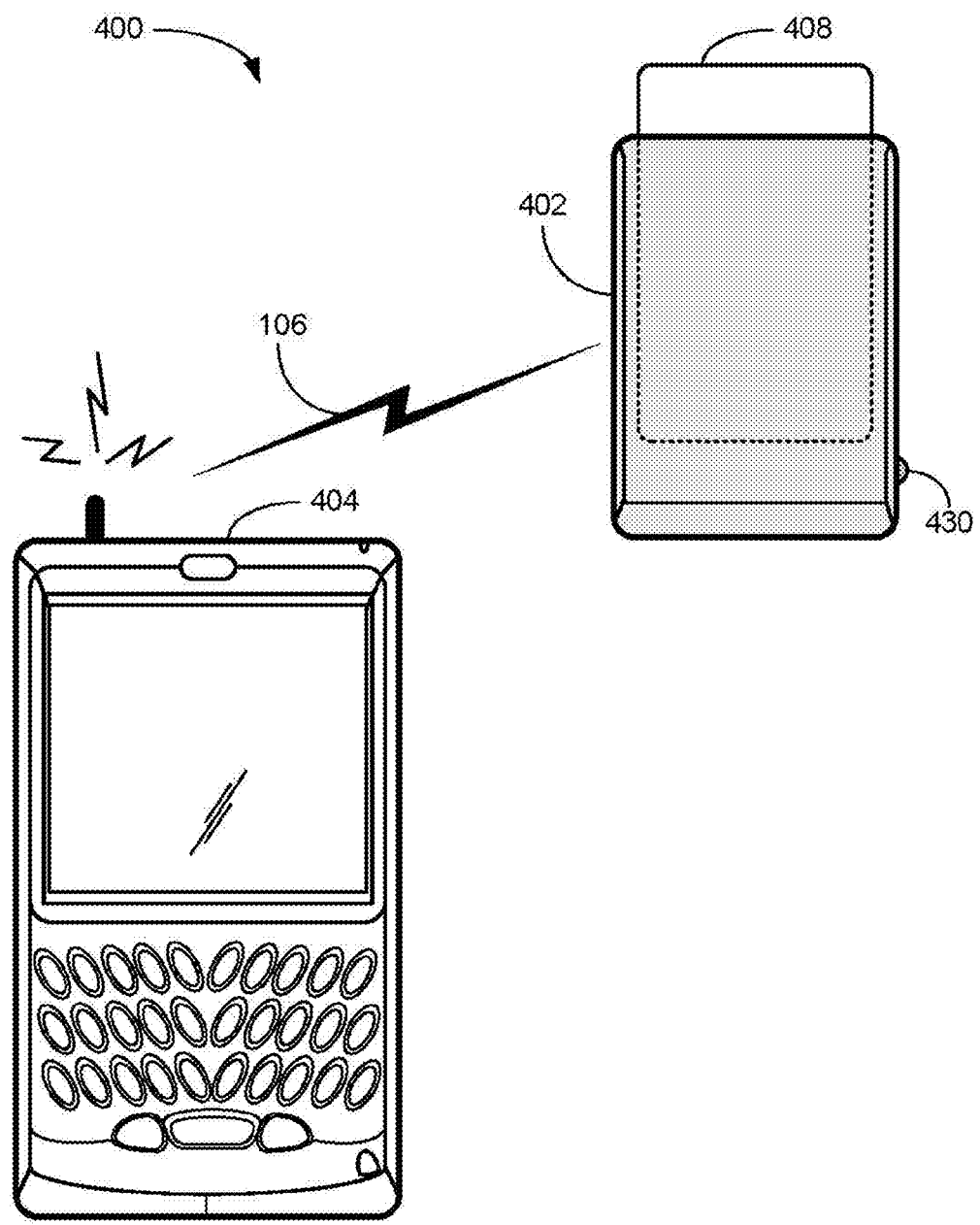
FIG. 4 is an illustration of an exemplary communications system, according to some embodiments.

FIG. 4 is an illustration of an exemplary communication system 400, according to some embodiments. System 400 is similar to system 100 of FIG. 1, where device 102 is a wireless smart card reader 402, and device 104 is a mobile device 404. Mobile device 404 and smart card reader 402 are able to communicate over wireless communication link 106. In the example shown in FIG. 4, user input component 130 is an electro-mechanical device 430, however, other and/or additional user input components are possible.

A smart card 408 is shown inserted into smart card reader 402. Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with security information (e.g., a private decryption key, a private signing key, biometrics, etc.) and may include a processor and/or dedicated logic, for example, dedicated decryption logic and/or dedicated signing logic. A smart card may include a connector for powering the semiconductor device and performing serial communication with an external device. Alternatively, smart card functionality may be embedded in a device having a different form factor and different communication protocol, for example a Universal Serial Bus (USB) device. The person whose security information is stored on smart card 408 may use smart card reader 402 for identification, to unlock mobile device 404, and to digitally sign and/or decrypt messages sent by mobile device 404. Smart card 408 may also include a random number generator.

For example, mobile device 404 may be able to send and receive e-mail messages via an e-mail server (not shown). If, for example, the Secure Multipurpose Internet Mail Extensions (S/MIME) protocol is used, e-mail messages received at mobile device 404 are encrypted using a symmetric algorithm with a random session key generated by the sender of the e-mail message. The e-mail message also includes the session key, encrypted using the public key of the recipient. Upon receipt of an encrypted e-mail message, mobile device 404 may extract the encrypted session key and send it to smart card reader 402 via communication link 106. Smart card reader 402 may send the encrypted session key to smart card 408, and the decryption engine of smart card 408 may decrypt the encrypted session key using the recipient's private decryption key, which is stored in smart card 408. Smart card reader 402 may retrieve the decrypted session key from smart card 408 and forward it to mobile device 404 via communication link 106 so that mobile device 404 can decrypt the received e-mail message. The smart card 408 may prevent unauthorized use of the recipient's private decryption key by requiring that a password or personal identification number (PIN) be supplied before allowing the decryption operation to proceed.

Similarly, to add a digital signature to an e-mail message being sent by mobile device 404, mobile device 404 may send a hash of the contents of the e-mail message to smart card reader 402 over communication link 106. Smart card reader 402 may pass the hash to smart card 408, which may produce a digital signature from the hash and the sender's private signing key, which is stored in smart card 408. Smart card 408 may then pass the digital signature to smart card reader 402, which may forward it to mobile device 404 via communication link 106 so that mobile device 404 can transmit it along with the e-mail message to the e-mail server. Again, smart card 408 may prevent unauthorized use of the recipient's private signing key by requiring that a password or PIN be supplied before allowing the signing operation to proceed.

The unencrypted message key should be sent securely over communication link 106 from smart card reader 402 to mobile device 404 to prevent a third party from retrieving the message key from communication link 106. Similarly, the hash to be signed should be sent authentically over communication link 106 from smart card reader 402 to mobile device 404 to prevent a third party from modifying the hash and thereby causing smart card 408 to produce a signature using a hash different from the hash of the intended message. Therefore communication link 106 may need to be secured using cryptographic techniques.

To secure communication link 106, smart card reader 402 may need to generate various cryptographic keys. For example, if smart card reader 402 and mobile device 102 are BT devices, then a relatively short (up to 16-digits) key may be used for the Pairing procedure. An additional layer of security for communication link 106 may involve encryption with one or more additional keys. These additional keys may be generated from a shared secret between smart card reader 402 and mobile device 404, and one or more symmetric keys based on this shared secret may be generated using known Diffie-Hellman and simple password exponential key exchange (SPEKE) methods and variants thereof. Moreover, random session keys may be generated for each individual communication session over communication link 106.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to control the visibility of a wireless device in a discoverable mode, the method comprising:
   while said wireless device is in said discoverable mode, receiving an inquiry from an inquiring device that is searching for discoverable devices; and
   ignoring said inquiry if an identifier of said inquiring device is not ascertainable from said inquiry or if said identifier is not included in a set of identifiers of one or more devices previously connected to said wireless device.

2. The method of claim 1, wherein said discoverable mode is a general discoverable mode and wherein said inquiry is a general inquiry intended to discover devices in any discoverable mode that are within range of said inquiring device.

3. The method of claim 1, wherein said discoverable mode is a limited discoverable mode and wherein said inquiry is a limited inquiry intended to discover only devices in said limited discoverable mode that are within range of said inquiring device.

4. A method to control the visibility of a wireless device in a discoverable mode, the method comprising:
   while said wireless device is in said discoverable mode, receiving an inquiry from an inquiring device that is searching for discoverable devices; and
   ignoring said inquiry a) if an identifier of said inquiring device is not ascertainable from said inquiry or b) if said identifier does not correspond to any particular manufacturer or c) if said identifier corresponds to a particular manufacturer and an identifier of said particular manufacturer is not included in a set of identifiers of one or more permitted manufacturers.

5. The method of claim 4, wherein said discoverable mode is a general discoverable mode and wherein said inquiry is a general inquiry intended to discover devices in any discoverable mode that are within range of said inquiring device.

6. The method of claim 4, wherein said discoverable mode is a limited discoverable mode and wherein said inquiry is a limited inquiry intended to discover only devices in said limited discoverable mode that are within range of said inquiring device.

7. A method to control the visibility of a wireless device in a discoverable mode, the method comprising:
while said wireless device is in said discoverable mode, receiving an inquiry from an inquiring device that is searching for discoverable devices;
ignoring said inquiry where an identifier of said inquiring device is not ascertainable from said inquiry; and
where said identifier is ascertainable from said inquiry:
responding to said inquiry where said identifier is included in a first set of identifiers of one or more devices previously connected to said wireless device;
responding to said inquiry where said identifier is not included in said first set, said identifier corresponds to a particular manufacturer, and an identifier of said particular manufacturer is included in a second set of identifiers of one or more permitted manufacturers; and
ignoring said inquiry where said identifier is not included in said first set and said identifier of said particular manufacturer is not included in said second set.

8. The method of claim 7, wherein said discoverable mode is a general discoverable mode and wherein said inquiry is a general inquiry intended to discover devices in any discoverable mode that are within range of said inquiring device.

9. The method of claim 7, wherein said discoverable mode is a limited discoverable mode and wherein said inquiry is a limited inquiry intended to discover only devices in said limited discoverable mode that are within range of said inquiring device.

10. A wireless device comprising:
a wireless communication interface able to cause said wireless device to be in a discoverable mode and through which said wireless device is able to receive an inquiry from an inquiring device that is searching for discoverable devices;
a processor coupled to said wireless communication interface; and
a memory coupled to said processor,
wherein said memory is to store a set of identifiers of one or more devices previously connected to said wireless device, and
wherein said memory is to store code which, when executed by said processor while said wireless device is in said discoverable mode, ignores said inquiry if an identifier of said inquiring device is not ascertainable from said inquiry or if said identifier is not included in said set.

11. The wireless device of claim 10, wherein said wireless device is a smart card reader.

12. The wireless device of claim 10, wherein said wireless communication interface comprises a wireless personal area network (WPAN) interface.

13. A wireless device comprising:
a wireless communication interface able to cause said wireless device to be in a discoverable mode and through which said wireless device is able to receive an inquiry from an inquiring device that is searching for discoverable devices;
a processor coupled to said wireless communication interface; and
a memory coupled to said processor,
wherein said memory is to store a set of identifiers of one or more permitted manufacturers, and
wherein said memory is to store code which, when executed by said processor while said wireless device is in said discoverable mode, ignores said inquiry a) if an identifier of said inquiring device is not ascertainable from said inquiry or b) if said identifier does not correspond to any particular manufacturer or c) if said identifier corresponds to a particular manufacturer and an identifier of said particular manufacturer is not included in said set.

14. The wireless device of claim 13, wherein said wireless device is a smart card reader.

15. The wireless device of claim 13, wherein said wireless communication interface comprises a wireless personal area network (WPAN) interface.

16. A wireless device comprising:
a wireless communication interface able to cause said wireless device to be in a discoverable mode and through which said wireless device is able to receive an inquiry from an inquiring device that is searching for discoverable devices;
a processor coupled to said wireless communication interface; and
a memory coupled to said processor,
wherein said memory is to store a first set of identifiers of one or more devices previously connected to said wireless device and a second set of identifiers of one or more permitted manufacturers, and
wherein said memory is to store code which, when executed by said processor while said wireless device is in said discoverable mode, ignores said inquiry if an identifier of said inquiring device is not ascertainable from said inquiry, and where said identifier is ascertainable from said inquiry:
a) responds to said inquiry where said identifier is included in said first set,
b) responds to said inquiry where said identifier is not included in said first set, said identifier corresponds to a particular manufacturer, and an identifier of said particular manufacturer is included in said second set, and
c) ignores said inquiry where said identifier is not included in said first set and said identifier of said particular manufacturer is not included in said second set.

17. The wireless device of claim 16, wherein said wireless device is a smart card reader.

18. The wireless device of claim 16, wherein said wireless communication interface comprises a wireless personal area network (WPAN) interface.

* * * * *